(12) United States Patent
Jueptner

(10) Patent No.: US 8,626,402 B2
(45) Date of Patent: Jan. 7, 2014

(54) DRIVE ARRANGEMENT AND METHOD FOR A WORK MACHINE WITH TWO INTERNAL COMBUSTION ENGINES

(75) Inventor: Detlef Jueptner, Kleinblittersdorf (DE)

(73) Assignee: Deere & Company, Moline, IL (US)

( * ) Notice: Subject to any disclaimer, the term of this patent is extended or adjusted under 35 U.S.C. 154(b) by 361 days.

(21) Appl. No.: 12/896,204

(22) Filed: Oct. 1, 2010

(65) Prior Publication Data
US 2011/0246030 A1    Oct. 6, 2011

(30) Foreign Application Priority Data
Dec. 1, 2009 (DE) .......................... 10 2009 047 343

(51) Int. Cl.
*G06F 7/70* (2006.01)

(52) U.S. Cl.
USPC .......................................................... 701/50

(58) Field of Classification Search
None
See application file for complete search history.

(56) References Cited

U.S. PATENT DOCUMENTS

| | | | |
|---|---|---|---|
| 4,161,991 A * | 7/1979 | van der Lely | 180/53.7 |
| 2009/0177345 A1* | 7/2009 | Severinsky et al. | 701/22 |
| 2009/0242301 A1 | 10/2009 | McClanahan et al. | |
| 2010/0082192 A1* | 4/2010 | Hofbauer | 701/22 |

FOREIGN PATENT DOCUMENTS

| | | |
|---|---|---|
| AU | 6163380 | 2/1982 |
| DE | 6949295 | 12/1969 |
| DE | 3741891 | 6/1989 |
| DE | 102008009447 | 8/2009 |
| EP | 1640201 | 3/2006 |
| EP | 1731345 | 12/2006 |
| EP | 1818524 | 8/2007 |

OTHER PUBLICATIONS

European Search Report, Mar. 1, 2011, 4 Pages.

* cited by examiner

*Primary Examiner* — Thomas Tarcza
*Assistant Examiner* — Adam Alharbi

(57) ABSTRACT

A drive arrangement for a work machine is provided, having a first internal combustion engine and a second internal combustion engine. A controller is allocated to the internal combustion engines, and a drive train is selectively connected to both internal combustion engines for driving elements of the work machine. In the case of a double-engine mode, the controller specifies a maximum single power (P1) of the internal combustion engines that is less than the maximum power (P2) that can be specified by the controller for an internal combustion engine operating in the single-engine mode.

3 Claims, 3 Drawing Sheets

DRIVE ARRANGEMENT AND METHOD FOR A WORK MACHINE WITH TWO INTERNAL COMBUSTION ENGINES

FIELD OF THE INVENTION

The invention relates to a drive arrangement for a work machine having a first internal combustion engine and a second internal combustion engine. A controller is allocated to the internal combustion engines. A drive train can be connected to the two internal combustion engines for driving elements of the work machine. An associated method is also described.

BACKGROUND OF THE INVENTION

In recent years, self-propelled agricultural harvesting machines have been equipped with more and more powerful internal combustion engines that can currently output, in the case of forage harvesters, up to 800 kW. Due to the relatively small number of such powerful engines produced, these engines are relatively expensive and usually more expensive than two internal combustion engines that each have half the power. Furthermore, the entire power of the engine is not always needed—for example, it is usually not needed during transport on a street or while mowing. This leads to poorer efficiency of the engine than during full-load operation, which is why it was proposed, e.g., in European Patent Application EP 1 640 201 A1 to equip a self-propelled harvesting machine with two internal combustion engines of which one can be added to the other internal combustion engine for handling greater power requirements. Consequently, the first internal combustion engine is always in operation, while the second internal combustion engine is turned on only when needed. In the single-engine mode, the power of an individual internal combustion engine is available, and in the double-engine mode, the power of both internal combustion engines is available, i.e., twice the power. The maximum available power from the individual internal combustion engines is the same in both operating modes. Similar arrangements are also used in airplanes and buses, e.g. German Patent Documents DE 69 49 295 U1 and DE 37 41 891 A1, respectively. The mentioned harvesting machines are also available on the market with internal combustion engines of different powers, wherein the first internal combustion engine has the greater power.

There are certain operating conditions in which the power of a single internal combustion engine is not sufficient, for example, while harvesting a relatively thin crop or while in transport with a towed harvesting attachment when a steep incline is to be climbed. One could indeed equip the work machine with one or two internal combustion engines of greater power, but in the case of the double-engine mode, this would again have the result that the other components of the work machine, in the case of a harvesting machine, for example, the drive train for driving crop-processing devices and the devices themselves would have to be designed larger. In many cases, however, this measure is undesirable for reasons of cost and/or weight. The known solution with a larger primary engine and a smaller secondary engine that can be connected is disadvantageous in so far as the primary engine experiences significantly greater wear.

SUMMARY OF THE INVENTION

The problem forming the basis of the invention is seen in improving a drive arrangement comprising two internal combustion engines for a work machine to the extent that, in the single-engine mode, power sufficient for many applications is provided, but upper power limits are observed in the double-engine mode.

A drive arrangement for a work machine comprises a first internal combustion engine, a second internal combustion engine, a controller allocated to the internal combustion engines, and a drive train that can be connected to both internal combustion engines for driving elements of the work machine. In the double-engine mode, the controller specifies a maximum single power of the internal combustion engines that is less than the maximum power specified by the controller for an internal combustion engine operated in the single-engine mode. In one embodiment, the maximum power of an internal combustion engine in the single-engine mode could be, for example, 500 kW, while it equals only 400 kW in the double-engine mode. Consequently, in the double-engine mode, there is an overall maximum of 800 kW available.

In this way the power in the double-engine mode is limited at the top to a value that lies below the sum of the maximum individual powers of the internal combustion engines in the single-engine mode. Therefore, the drive train of the work machine and its driven elements are designed for only this reduced power. In the case of the single-engine mode, however, a power is available that is sufficient for many (and more than in the prior art) applications.

Advantageously, both internal combustion engines could be used alternately in the single-engine mode, in order to be able to distribute the wear on them as uniformly as possible. For this purpose, they are each connected to the drive train by way of a detachable coupling. However, an arrangement with a continuously running first internal combustion engine and a second internal combustion engine that can be connected to the drive train is also possible.

The invention can be used on any work machine, for example, construction machines, such as diggers or wheel loaders, agricultural tractors or harvesting machines, in particular, combine harvesters, forage harvesters, or cotton harvesters.

BRIEF DESCRIPTION OF THE DRAWINGS

A detailed description of an embodiment of the invention is set forth below with reference to the accompanying drawings wherein.

DESCRIPTION OF THE PREFERRED EMBODIMENT

Figure 1:
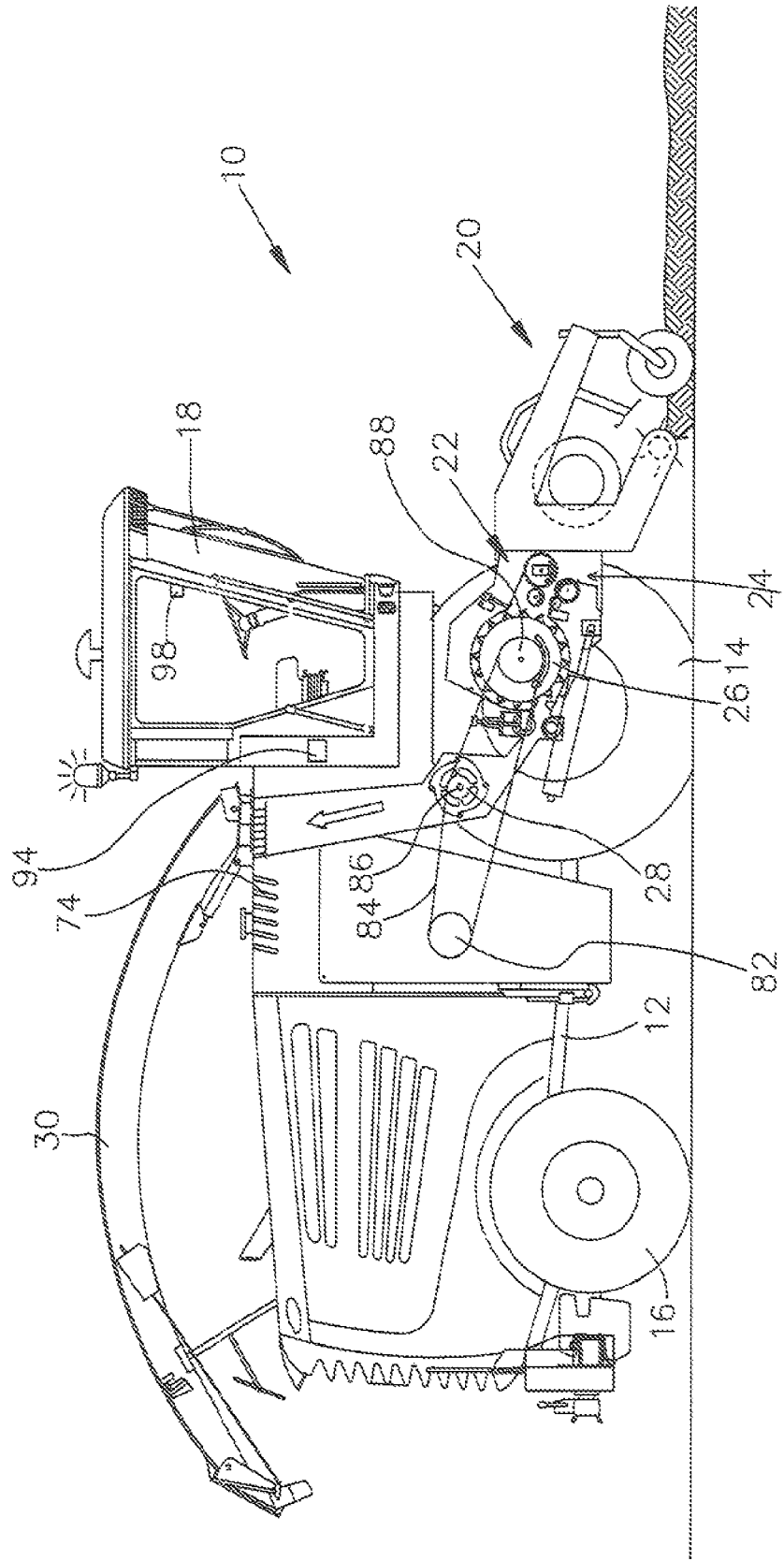
FIG. 1 is a schematic side view of a work machine in the form of a forage harvester.

In FIG. 1, a work machine 10 is shown as a kind of self-propelled forage harvester in a schematic side view. The work machine 10 is mounted on a frame 12 that is carried by front, driven wheels 14 and steerable, rear wheels 16. The work machine 10 is operated from a driver's cab 18 from which a harvesting attachment 20 in the form of a pick-up can be seen. The crop, e.g., grass or the like, picked up from the ground by means of the harvesting attachment 20 is fed by means of an in-take auger 22 with prepress rollers that are arranged within an in-take housing 24 on the front side of the work machine 10 to a chopping drum 26 that is arranged underneath the driver's cab 18 and chops the crop into small pieces and discharges it to a conveying device 28. The material exits the work machine 10, via a discharge chute 30 that can rotate about an approximately vertical axis and can be adjusted in its slope, to a transport vehicle traveling alongside. It should be noted here that in the description below directional information, such as side, bottom, and top, refer to the direction of forward motion V of the work machine 10 that moves to the right in FIG. 1.

Figure 2:
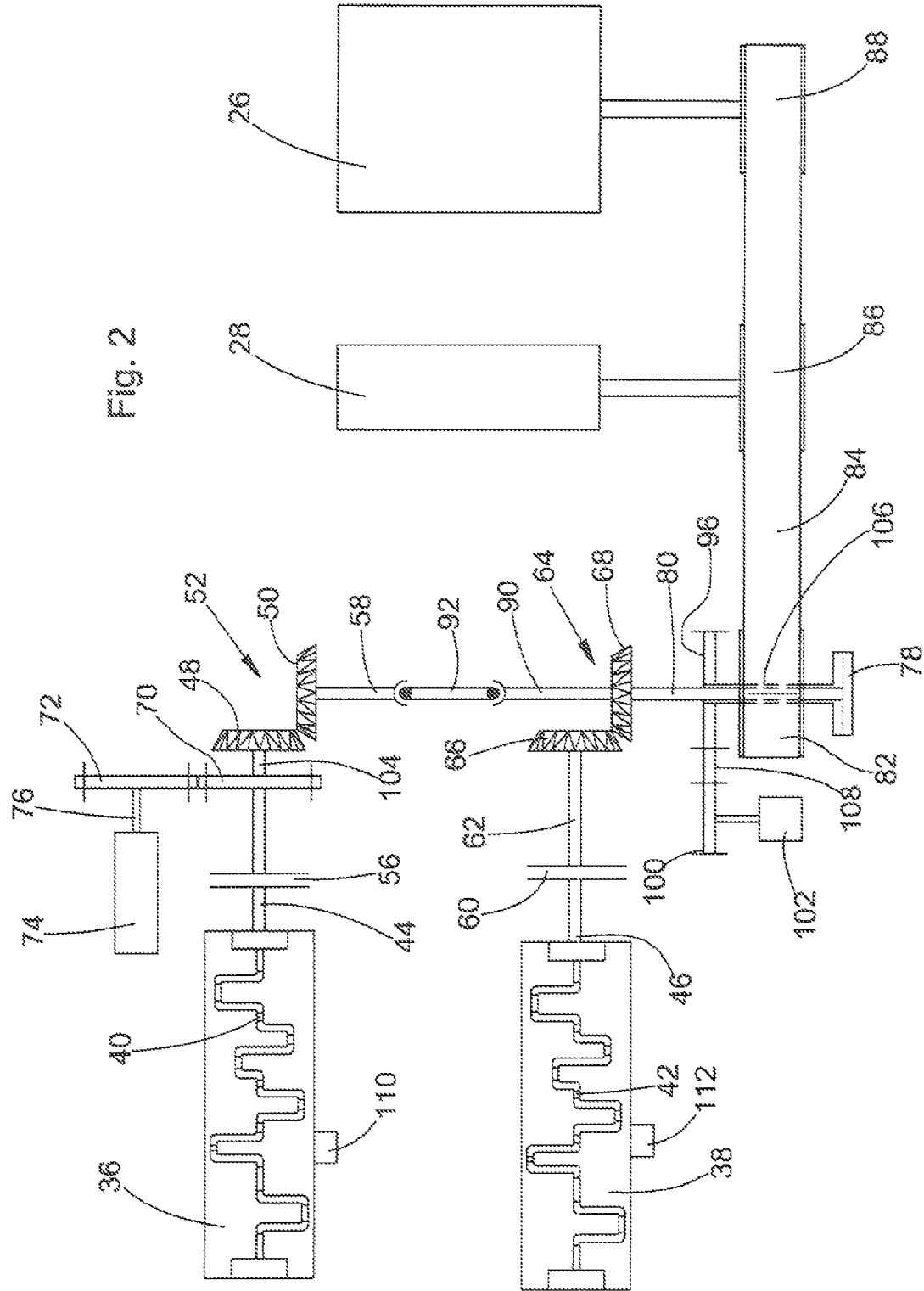
FIG. 2 is a schematic top view of the drive arrangement of the work machine of FIG. 1; and, FIG. 3 is a flow chart according to which the controller controls the internal combustion engine.

FIG. 2 shows a top view of the drive arrangement of the work machine 10. In the rear region of the work machine 10, there are two (first and second) internal combustion engines 36, 38 respectively, arranged behind the rear axle, in particular, in the form of diesel engines arranged laterally one next to the other. The maximum powers of the internal combustion engines 36, 38 are advantageously identical, although internal combustion engines 36, 38 of different powers could also be used. The internal combustion engines 36, 38 extend in the forward direction of the work machine 10 up to approximately the rear end of the frame 12 and comprise first and second crankshafts 40, 42 respectively, that extend forward from the housings of the internal combustion engines 36, 38. The crankshafts 40, 42 each drive a (first and second) longitudinal shaft 44, 46 extending horizontally and forward.

While operating, the first internal combustion engine 36 drives, with its crankshaft 40, a first longitudinal shaft 44 that is connected to the input side of a first coupling 56. The output side of the first coupling 56 is connected by means of a fourth longitudinal shaft 104 to a first conical gear wheel 48 of a first angular gear 52. The fourth longitudinal shaft 104 also drives, by means of gear wheels 70, 72 and a fifth longitudinal shaft 76, a pump assembly 74 that comprises a hydraulic pump for driving hydraulic motors for the propulsion of the harvesting machine, a steering pump, a hydraulic pump for driving hydraulic motors for the harvesting attachment 22, and a hydraulic pump for feeding oil to the controller of the hydrostatic drive for the propulsion of the work machine 10. It is also conceivable to drive other continuously driven elements, such as an electrical generator and/or a blower drive for feeding cooling air to the internal combustion engines 36, 38 by means of one of the gear wheels 70, 72 or an intermediate gear wheel (not shown).

The second conical gear wheel 50 of the first angular gear 52 is connected to a first section 58 of a transverse shaft 58, 80, 90 that is connected, in turn, via a universal-joint drive shaft 92 to a second section 90 of the transverse shaft 58, 80, 90 that extends up to a second conical gear wheel 68 of the second angular gear 64. During operation, the second internal combustion engine 38 drives, with its crankshaft 42, a second longitudinal shaft 46 that is connected to the input side of a second coupling 60. The output side of the second coupling 60 is connected via a third longitudinal shaft 62 to the first conical gear wheel 66 of the second angular gear 64.

The internal combustion engines 36, 38 are mounted separately from each other on the frame 12 or a secondary frame, usually by means of damping elements. The associated couplings 56 or 60 and angular gears 52, 64 are also mounted on their housings. The universal-joint drive shaft 92 allows for the compensation of possible tolerances of the positions of the internal combustion engines 36, 38 and the angular gears 52, 64.

The second section 90 of the transverse shaft 58, 80, 90 and the second conical gear wheel 68 of the second angular gear 64 are connected to an outer section 80 of the transverse shaft 58, 80, 90 that extends through a hollow shaft 106 connected to the belt pulley 82 on the side of the belt pulley 82 away from the angular gears 52, 64, and is connected there to a third coupling 78. The belt pulley 82 is wrapped around a drive belt 84 that also wraps around a belt pulley 86 for driving the auger device 28 and a belt pulley 88 for driving the chopping drum 26. Instead of or in addition to the third coupling 78, the drive train of the chopping drum 26 and the auger device 28 can also be set in motion or stopped by a mechanism for tensioning and loosening the drive belt 84. The third coupling 78 is connected on the output side to the hollow shaft 106 that also drives, on the side of the belt pulley 82 facing the angular gears 52, 64, via gear wheels 96, 108, and 100, a hydraulic pump 102 that is used for driving a hydraulic motor (not shown) for driving the take-in auger 22. The third coupling 78 allows the drive belt 84 and with it the chopping drum 26 and the auger device 28 to be turned on and off. The gear wheels 96, 108, and 100 could be mounted within a housing that is mounted on the housing of the second angular gear 64. In contrast, the gear wheels 70 and 72 are advantageously integrated within the housing of the first angular gear 52 and the first coupling 56.

Figure 3:
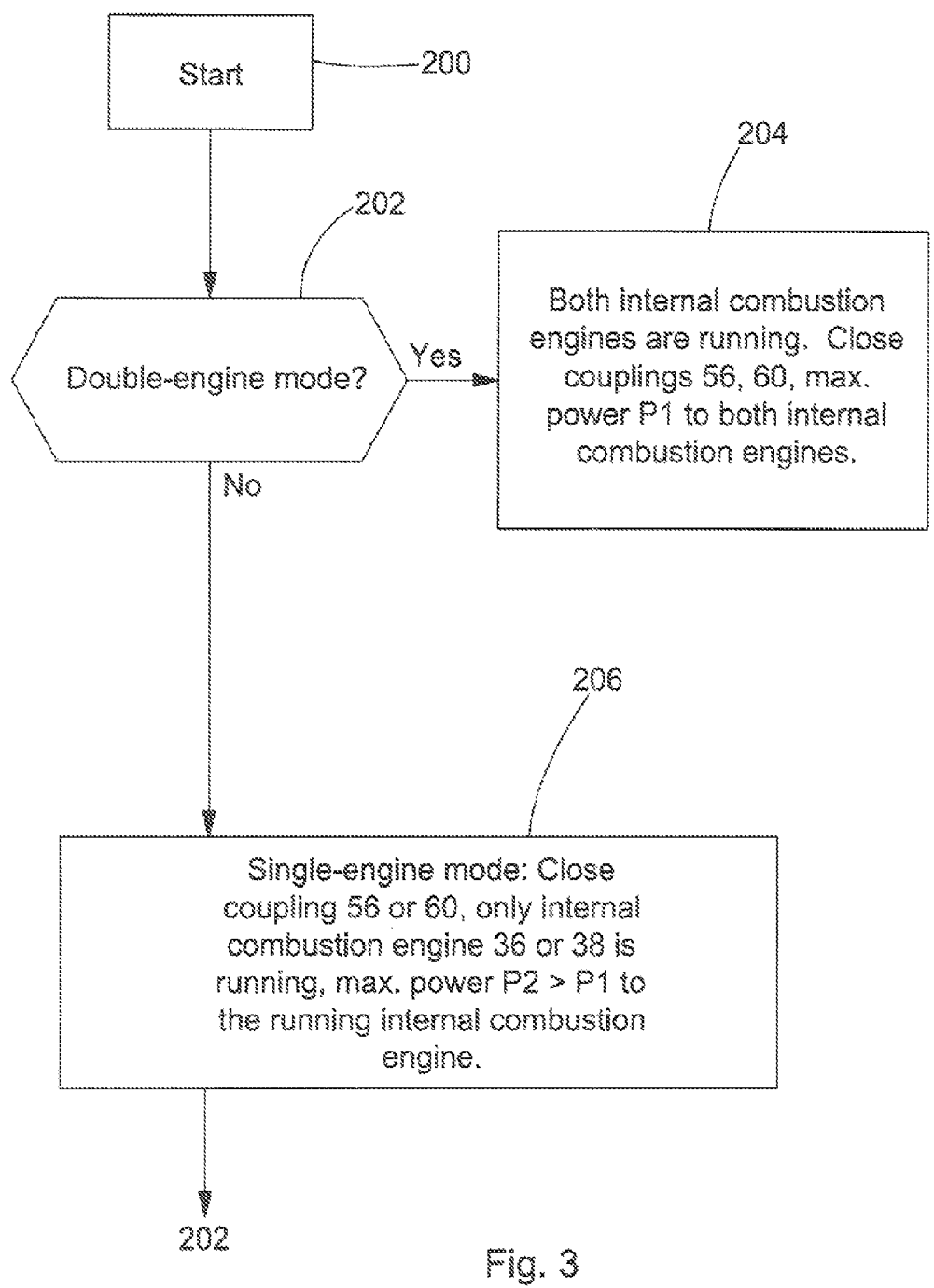

A suitable controller 94 (see FIG. 1) is used in the case of both embodiments for connecting and separating the internal combustion engines 36, 38 from the drive train. The controller 94 is connected to the couplings 56, 60, and 78 and to engine controllers 110, 112 of the internal combustion engines 36 and 38. In addition to the stoppage of the internal combustion engines 36, 38, three operating modes are possible, as shown below with reference to the flow chart of FIG. 3. After the start in Step 200, in Step 202 it is queried whether a double-engine mode is required or desired. This is selected in the case of greater power requirements, for example, while harvesting corn with a mowing attachment (not shown) mounted instead of the pick-up 20, and Step 204 follows, according to which both internal combustion engines 36, 38 are running and the couplings 56 and 60 are closed. The third coupling 78 is used in a known way to turn on and off the auger device 28 and the chopping drum 26 when needed, wherein a suitable interface 98 (e.g., switch) is connected to the controller 94. In addition, the controller 94 instructs the engine controllers 110, 112 to let the internal combustion engines 36 and 38 each run at a maximum power P1. If the two internal combustion engines 36, 38 are of the same type and the same maximum power, the maximum power P1 commanded to each of them is the same magnitude. If they are different, different maximum powers P1 can be commanded to them.

In the case of lower power requirements, e.g., for harvesting a swath by means of the pick-up 20 shown in FIG. 1 or when driving on a street or when, while harvesting corn, only individual rows at the edge of the field are to be harvested, in Step 206 that follows Step 202, if no double-engine mode is provided, then only one of the internal combustion engines 36 or 38 is needed, while the other internal combustion engine 38 or 36 is stopped. The coupling 60 or 56 allocated to the unneeded internal combustion engine 38 or 36 is then opened, while the other coupling 56 or 60 is closed and also drives the pump assembly 74. In addition, the controller 94 instructs the engine controller 110 or 112 of the running internal combustion engine 36 or 38 to let the running internal combustion engine 36 or 38 to run at a maximum power P2. The maximum power P2 in Step 206 is greater than the maximum power P1 in Step 204. If the two internal combustion engines 36, 38 are of the same type and the same maximum power, then the maximum power P2 commanded to each of them is the same magnitude. If they are different, different maximum powers P2 can be commanded to them.

Then Step 202 follows again. Consequently, if both internal combustion engines 36 and 38 are needed later, the stationary internal combustion engine 38 or 36 is started up, brought to the rotational speed of the running internal combustion engine 36 or 38, and the associated coupling 60 or 56 is closed. It would also be possible to close the associated coupling 60 or 56 for starting up the stationary internal combustion engine 38 or 36 and to start it in this way.

An internal combustion engine 36 or 38 can be connected to or disconnected from the drive train by an operator input by means of the interface 98 or automatically by the controller 94, e.g., based on load-sensing equipment of the internal combustion engines 36 and/or 38 (for example, with reference to its rotational speed) or on a torque sensor in the drive train. It is also conceivable to automatically turn off one of the internal combustion engines 36, 38 by the controller 94 when a street/field mode switch of the interface 98 is located in the street mode position and to automatically turn it on when the street/field mode switch is located in the field-mode position and an automatic harvesting attachment detector (see European Patent Application EP 0 377 163 A or German Patent Document DE 199 49 994 A) signals that a corn-harvesting attachment is mounted, while one of the internal combustion engines 36, 38 always remains turned off when a harvesting attachment 20 in the form of a pick up (as shown in FIG. 1) is detected. In the single-engine mode, the controller 94 uses both internal combustion engines 36, 38 alternately (in particular, with reference to their operating hours or the consumed fuel or the delivered kWh), in order to keep their wear approximately equal.

In the double-engine mode, the maximum power to be output by the internal combustion engines 36, 38 is less than in the single-engine mode. Therefore, in the single-engine mode, in the case of internal combustion engines 36, 38 of the same type, more than half of the maximum total power is available, which increases the number of actions that can be served in the single-engine mode, but makes it unnecessary to adapt the drive train to a greater maximum power in the double-engine mode.

Having described the preferred embodiment, it will become apparent that various modifications can be made without departing from the scope of the invention as defined in the accompanying claims.

The invention claimed is:

1. A drive arrangement for a self-propelled agricultural harvesting machine, the work machine having a first internal combustion engine, a second internal combustion engine, a controller allocated to both the first and second internal combustion engines, and a drive train that can be connected to both internal combustion engines for driving elements of the work machine:
   wherein in a double-engine mode the controller specifies a maximum single power (P1) of the internal combustion engines that is less than a maximum power (P2) that can be specified by the controller for an internal combustion engine operating in a single-engine mode; and,
   wherein components of the drive train are sized and adapted only for up to the maximum power (P2) that can be specified by the controller for an internal combustion engine operating in the single-engine mode.

2. A drive arrangement according to claim 1, wherein both internal combustion engines are selectively connected to the drive train by corresponding couplings allocated to the engines.

3. A method for operating a drive arrangement for a self-propelled agricultural harvesting machine, wherein the drive arrangement comprises a first internal combustion engine, a second internal combustion engine, a controller allocated to the internal combustion engines, and a drive train that is selectively connected to two internal combustion engines for driving elements of the work machine, the method comprising the steps of:
   specifying a maximum single power (P1) for the internal combustion engines in the case of the double-engine mode; and,
   specifying, in the case of a single-engine mode, a maximum single power (P2) for the running internal combustion engine in the double-engine mode wherein the maximum single power (P1) is less than the maximum power (P2) in the single-engine mode.

* * * * *